United States Patent [19]
Hüttner et al.

[11] 3,962,585
[45] June 8, 1976

[54] ARRANGEMENT FOR THE LIGHT-PROJECTION OF INDICIA ONTO X-RAY FILMS

[75] Inventors: Robert Hüttner; Gerhard Kutterer, both of Erlangen, Germany

[73] Assignee: Siemens Aktiengesellschaft, Erlangen, Germany

[22] Filed: Mar. 20, 1975

[21] Appl. No.: 560,232

[30] Foreign Application Priority Data
Mar. 29, 1974 Germany............................ 2415423

[52] U.S. Cl............................... 250/476; 250/481; 250/475
[51] Int. Cl.²......................................... G03C 5/16
[58] Field of Search................... 250/475, 476, 481; 355/40

[56] References Cited
UNITED STATES PATENTS
2,773,436   12/1956   Martin................................. 250/476

*Primary Examiner*—Alfred E. Smith
*Assistant Examiner*—B. C. Anderson
*Attorney, Agent, or Firm*—Haseltine, Lake & Waters

[57] ABSTRACT

An arrangement for the light-projection of indicia onto X-ray films, consisting of an X-ray film cassette having a window provided in a cassette wall extending in parallel with the film plane, including a magnetically-openable slide plate adapted to maintain the window in the closed position thereof in a light-sealed closeable condition, which is at least partly constituted of ferromagnetic material and is retained in a closed position by means of a resilient tongue and is supported so as to be rotatable about a pivot axis oriented perpendicularly to the film plane, a carrier for the indicia which are to be projected, and a light projecting device including a magnet at the entry path of the X-ray film cassette having its location correlated to the location of the window of the inserted X-ray film cassette.

6 Claims, 5 Drawing Figures

ARRANGEMENT FOR THE LIGHT-PROJECTION OF INDICIA ONTO X-RAY FILMS

1. Field of the Invention

The present invention relates to an arrangement for the light-projection of indicia onto X-ray films, consisting of an X-ray film cassette having a window provided in a cassette wall extending in parallel with the film plane, including a magnetically-openable slide plate adapted to maintain the window in the closed position thereof in a light-sealed closeable condition, which is at least partly constituted of ferromagnetic material and is retained in a closed position by means of a resilient tongue and is supported so as to be rotatable about a pivot axis oriented perpendicularly to the film plane, a carrier for the indicia which are to be projected, and a light projecting device including a magnet at the entry path of the X-ray film cassette having its location correlated to the location of the window of the inserted X-ray film cassette.

2. Discussion of the Prior Art

In the construction of an arrangement of the above-mentioned type, particular care must be exercised to make certain that the window of the introduced X-ray film cassette is dependably opened by the magnet even during the most unfavorable operating situations. In the above-mentioned arrangement, during the extremely rapid introduction of the X-ray film cassette into the arrangement, it may occur that the slide plate opens the window of the X-ray film cassette during the passing by of the magnet, but will again close the window at the immediately following contact of the X-ray film cassette with the cassette guides located interiorly of the arrangement as a result of the jolting braking or impact. In that case, the indicia, or patient's data, are not projected onto the X-ray film. These errors, however, are essentially only later determined after the developing of the X-ray film. The subsequent association of the X-ray film with the particular patient at that timepoint, however, caused considerable difficulties and, upon occasion, may be even completely impossible.

SUMMARY OF THE INVENTION

Accordingly, it is an object of the present invention to so modify an arrangement for the light-projection of indicia onto X-ray films whereby the window of the X-ray film cassette located within the arrangement is opened at an enhanced degree of dependability, even during the most unfavorable operating conditions.

In an arrangement of the above-mentioned type, in an inventive manner, the magnet is supported so as to be pivotable about a further axis of the X-ray film cassette inserted into the light-projecting arrangement, which is in alignment with the pivot axis of the slide plate. Hereby is achieved that the magnet can follow the slide plate into the X-ray film cassette, and the air gap between the magnet and the ferromagnetic portion of the slide plate may be maintained smaller in all of its positions. Concurrently, there is also created the prerequisite that the slide plate may be pivoted in the X-ray film cassette about large angles than would be possible with stationary magnets. If it becomes possible to pivot the slide plate about an angle out of the horizontal position thereof, in which its center of gravity is located either somewhat above or below its pivot axis, then upon the contact of the X-ray film cassette within the arrangement, the largest portion of the accelerating forces are absorbed by the pivot axis of the slide plate. The previously opened window of the X-ray film cassette thus remains opened at an increased degree of assuredness.

In a particularly advantageous further embodiment of the invention, the magnet may be pivoted in a motorized manner in the pivoting direction of the slide plate into the X-ray film cassette, upon the full insertion of the X-ray film cassette into the light-projecting arrangement, by means of a switch which is actuated by the X-ray film cassette. This embodiment evidences the particular advantage that the opening of the window of the X-ray film cassette is only effectuated when the latter has already reached its final position within the arrangement.

BRIEF DESCRIPTION OF THE DRAWINGS

Further details of the invention are now described in greater detail with respect to two exemplary embodiments thereof, taken in conjunction with the accompanying drawings; in which.

DETAILED DESCRIPTION

Figure 1:
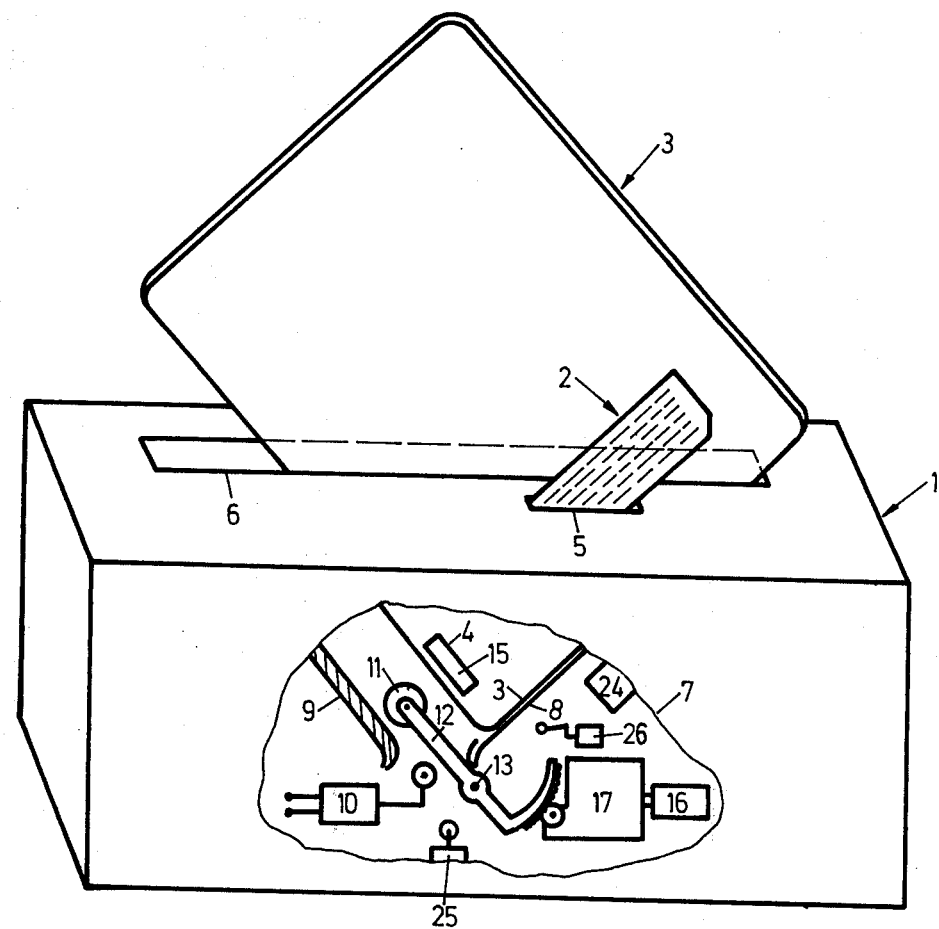
FIG. 1 shows a perspective, partially broken-through, general view of the inventive arrangement for the light projection of indicia onto X-ray films, in which the magnet for effecting the opening of the window of the X-ray film cassette is pivoted in a motorized manner.

The arrangement for the light-projection of indicia onto X-ray films consists of an installation 1, into which may be inserted a patient's data card containing the indicia or, respectively, patient's data which are to be projected, and an X-ray film cassette 3 having a window 4 through which the indicia or, respectively, patient's data may be projected onto an X-ray film sheet or plate located therein. FIG. 1 shows such an installation into which there has already been inserted a patient's card 2, and wherein an X-ray film cassette 4 is just being inserted for effecting the light projection of the patient's data. The installation on its upper surface, is provided with a slot 5 for the introduction of a patient's card 2, and a further somewhat wider slot 6 for the introduction of an X-ray film cassette 3. As may be ascertained through a break-through 7 in the wall of the installation 1, guide plates 8, 9 are associated with the slot 6 for the introduction of the X-ray film cassette 3, by means of which the inserted X-ray film cassette 3 is maintained in a definite position within the installation 1. In this defined position, the X-ray film cassette 3 finds itself in contact with a limit switch 10. Directly opposite the position, in which the window 4 of the X-ray film cassette is located, when the latter is inserted into the installation 1, a magnet 11 is supported by a two-armed lever 12. This lever is supported within the installation so as to be pivotable in a motorized manner about an axis 13 which is oriented in perpendicular to the film plane. The axis 13 of the lever 12 is generally aligned with the pivot axis 14 (FIG. 2) about which a slide plate 15 may be pivoted in the inserted X-ray film cassette. The lever 12 has a motor-driven drive 17 associated therewith, by means of which it can be pivoted about a predetermined angle. This angle is correlated to the pivoting angle of the slide plate 15 in the X-ray film cassette 3.

Figure 2:
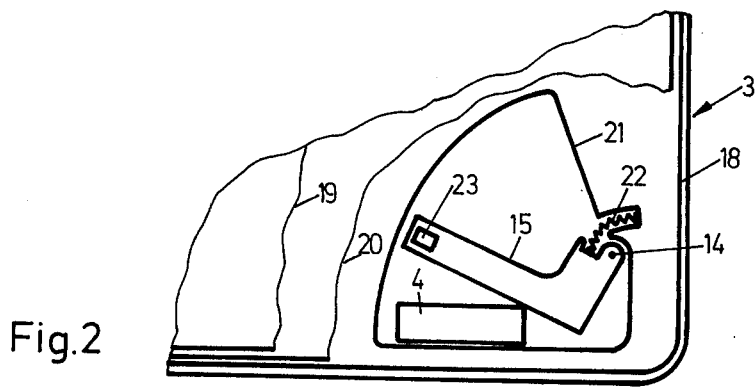
FIG. 2 is a fragmentary enlarged section of a cassette wall having a window therein which is closeable by means of a slide plate.

FIGURE FIG. illustrates a portion of the cassette wall 18 in which there is provided the window 4 for the light-projection of the patient's data. In FIG. 2, the window 4 is shown from interiorly of the X-ray film cassette. In order to clarify the construction of the slide plate 15, an amplifying foil 19, as well as a foam material member 20 is shown broken away in the region of the window 4. The window 4 is located proximate to the rim portion of the X-ray film cassette 3 within a recess or set-back 21 formed in the cassette wall. Within this recess is supported the angle-shaped slide plate 15 so as to be pivotable through an angle of about 90°. In one extreme position thereof, the slide plate closes the window 4 of the X-ray film cassette 3 in a light-sealed manner, and in the other extreme position thereof it leaves the window 4 fully opened. Through the intermediary of a spring 22, which is also located within this recess 21 of the cassette wall, the slide plate 15 is pressed into the position in which it closes the window 4 of the X-ray film cassette 3 in a light-sealing manner. The slide plate 15 consists of a light-impervious, light-weight material, preferably of a black-colored plastic material, and carries a ferromagnetic plate 23 at the end thereof remote from its pivot axis 14.

When the X-ray film cassette and the patient's data card are inserted into the installation 1, then after the full insertion of the X-ray film cassette, a limit switch 10 is actuated by a corner of the cassette. This limit switch 10, in series with a further limit switch 24 which is actuated through insert of the patient's card 2 into the slot 5, is connected to a current circuit which has also connected therewith the motor 16 for the drive 17, by means of which there is pivoted the lever 12. Thereby, the motor 16 is actuated as soon as the patient's card 2 and the X-ray film cassette 3 are both fully inserted into the installation. Through operation of the motor 16, the magnet 11, which is fastened to the lever 12, is set into an oscillating pivoting motion in parallel with the cassette surface, which is equi-axially oriented with regard to the movement which the slide plate 15 must subtend for effecting the opening, and the subsequent repeated closing, of the window 4 of the X-ray film cassette. In this case, the slide plate 15 in the inserted X-ray film cassette 3 is taken along in a particularly-satisfactory manner by the magnet 11. As soon as the lever 12 has reached the position in which the magnet 11 has fully opened the window 4 in the X-ray film cassette 3 then, by means of lever 12, there is actuated a further switch 25 which is located in the installation, through which there is then actuated a light source (not shown) for the light-projection of the patient's data. When the lever 12, together with magnet 11, during further operation, reaches its original rest and initial position, then the window 4 of the X-ray film cassette is again closed by the slide plate 15. In this rest position, the motor shuts itself off automatically by means of a further limit switch 26 which is actuated by the lever 12.

Figure 3:
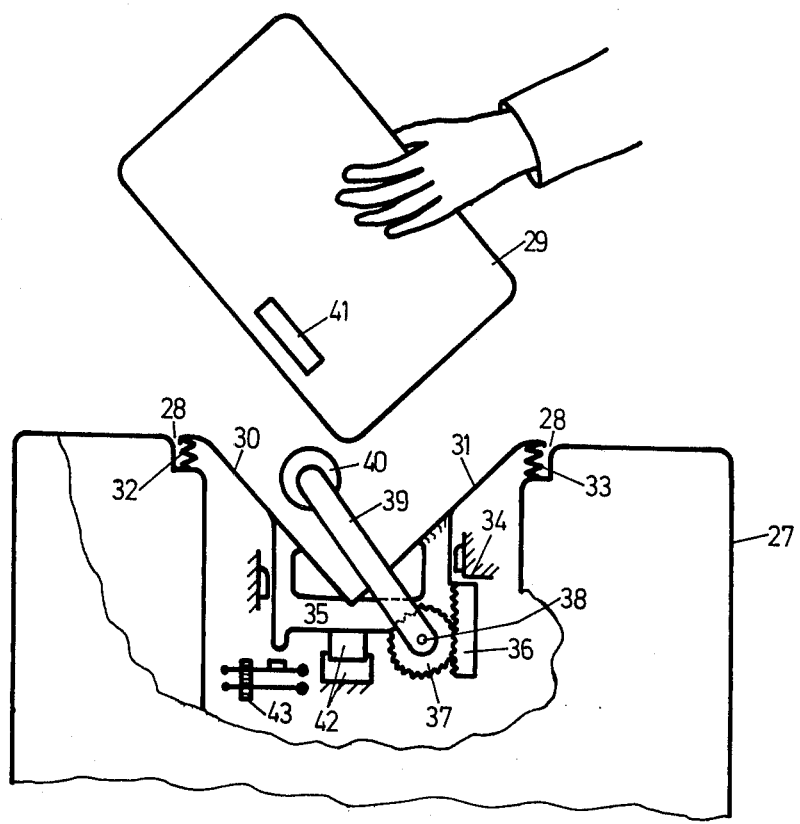
FIG. 3 is a partly broken-through view of an arrangement for the light-projection of indicia onto X-ray films including mechanically pivotable magnets.

FIG. 3 illustrates another installation 27 for the light projection of indicia in which, in an insert slot 28 for the X-ray film cassette 29, guide plates 30, 31 for the X-ray film cassette are supported so as to be slidable in the insert direction, and through springs 32, 33 are pressed, in opposition to the insert direction of the X-ray film cassette against a stop 34. The guide plates 30, 31, are fastened to a frame 35 which carries a gear rack 36. This gear rack 36 constantly is in engagement with a pinion 37. A one-armed lever 39 is rigidly fastened to this pinion, the latter being supported so as to be rotatable about an axis 38 which is oriented perpendicular to the film plane of the inserted X-ray film cassette 29. Fastened to the distal free end of the lever a permanent magnet 40. The permanent magnet 40, when the springs 32, 33 press the gear rack against the stop 34 finds itself, in its at-rest position, in a location in which it is positioned directly opposite the window 41 of the X-ray film cassette 29 lying in contact with the guide plates 30, 31. The frame has a shock damper 42 and a contact bank 43 associated therewith.

When an X-ray film cassette is inserted into the guide plates 30, 31 and manually pressed into the installation 27 against the force of the springs 32, 33, then the gear rack 36 will rotate the pinion 37. Consequently, the lever 39, together with the permanent magnet 40, is pivoted along the X-ray film cassette in the opening direction of the slider plate in the X-ray film cassette 39, and the window 41 in the film cassette is opened. In the extreme outermost position of the lever, when the guide plates 30, 31 are pressed into the installation 27, the support frame 35 closes a current circuit through the contact bank 43, and thereby initiates the light-projection of the indicia or, respectively, patient's data. Upon releasing of the X-ray film cassette, the latter is pressed out to some extent from the installation 27 through the action of springs 32, 33, together with the guide plates. Thereby, the permanent magnet 40 is again pivoted back through the pinion 37 and the gear rack 36, so that the window 41 of the X-ray film cassette is once again closed.

Figure 4:
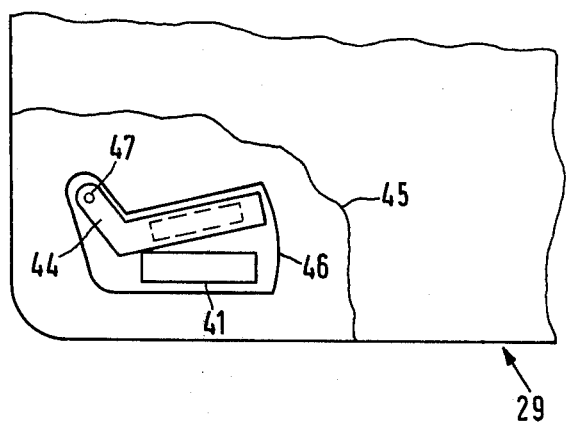
FIG. 4 is a fragmentary portion of the cassette wall having the window therein, shown broken-through, which is remote from the X-ray source during X-ray exposures.

In FIG. 4, there may be recognized in the partly broken-through illustration, that portion of the wall of the cassette 29 in which the window 41 is located and which faces away from the X-ray source during the X-ray exposure. In order to render visible the support of the slide plate 44, the external aluminum cladding 45 of the cassette is shown broken-through in the region of the window. It may be recognized that in the neighborhood of the window there is formed a recess 41 in conformance with the wall thickness of the slide plate, and which in its dimensions is conformed to the shape of the slide plate 44 with respect to its path of displacement. The slide plate is supported in this recess so as to be pivotable about an axis 47 oriented in perpendicular to the plane of the window. The path of movement of the slide plate 44 is so dimensioned that the slide plate may be pivoted into an extreme position in which it fully covers the window 41, and can be pivoted into another extreme position, as shown in FIG. 4, in which it allows the window to be fully opened.

Figure 5:
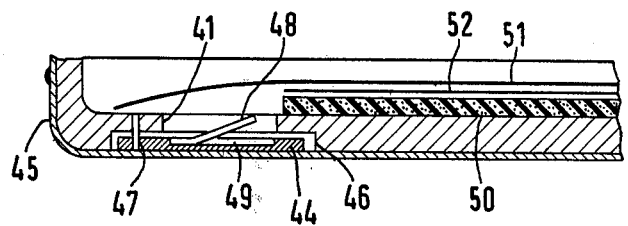
FIG. 5 shows a portion of the cassette wall in which the slide plate has been slid in front of the window.

In FIG. 5, which illustrates a section through the cassette wall at the level of the window 41, the slide plate 44 is shown slid in front of the window. In this FIG. 5 there may be also recognized that the slide plate is a thin flat plate which carries a resilient tongue 48 on the side facing towards the window 5, as shown in FIG. 4 with phantom lines, which in its external dimensions is conformed to the narrower dimensions of the window and which, in the closing position of the slide plate 44, springs into the opening of the window. This resilient tongue 48, which consists of a ferromagnetic material, is itself fastened within a notch 49 provided in the side surface of the slide plate facing towards the window. In FIG. 3 there may be recognized a foam material layer 50 arranged on the inside of the cassette wall, which serves to press the film 51 against amplifier foils 52 (only one illustrated), and which permits the window to remain unobstructed.

When the X-ray film cassette 29 is inserted into the light-projecting installation 27, and when the magnet 40 is swung past the window 41 of the X-ray film cassette 29, then the ferromagnetic tongue 48 is pulled out of the recess 41 of the window cut out, and pressed against the plate surface of the slide plate by means of the magnet, in opposition to its resilient spring force. During the pivoting movement of the magnet, the tongue, together with the slide plate, is taken along and the window 41 is thereby opened. Upon withdrawal of the cassette from the installation, the above sequence runs in a reversed series. As soon as the X-ray film cassette is withdrawn from the light-projecting installation, and consequently the ferromagnetic tongue is thereby removed from the sphere of influence of the magnetic field, it once agains resiliently springs into the opening of the window 41, and thereby arrests the slide plate 44 in its closing position. Hereby, for a closed X-ray film cassette, there no longer exists the possibility that the slide plate may be opened in a mechanical manner and to inadvertently expose the X-ray film. Also, after the exposed X-ray film 51 has been exchanged in a darkroom with an unexposed X-ray film and the X-ray film cassette is again closed, the window 41 still remains closed. There is thus precluded any inadvertent premature illumination of the area on the X-ray film which is provided for the light-projection of the patient's data.

While there has been shown what is considered to be the preferred embodiment of the invention, it will be obvious that modifications may be made which come within the scope of the disclosure of the specification.

What is claimed is:

1. In an arrangement for the light-projection of indicia onto X-ray films, including an X-ray film cassette having a window provided in a cassette wall extending in parallel to the plane of the film; a magnetically-openable slide plate having at least a portion thereof formed of a ferromagnetic material adapted to maintain said window in a light-sealed relationship in the closed position of the window, said slide plate having a resilient tongue for maintaining the slide plate in a closed position; said slide being formed of a nonmagnetic material and being displaceably supported along the side of the window facing away from the film in cassette, said resilient tongue being formed of said ferromagnetic material; means supporting said slide plate for pivoting about an axis oriented perpendicular to the plane of the film; a carrier for the indicia to be projected onto the X-ray films; and light-projecting means for receiving said X-ray film cassette having a magnet at the inlet path of the X-ray film cassette located in position correlated to the position of the window in the inserted X-ray film cassette, the improvement comprising: means mounting said magnet for pivotal movement about an axis in alignment with the pivot axis of said slide plate of the X-ray film cassette inserted into the light-projecting means.

2. An arrangement as claimed in claim 1, comprising switch means actuatable by said X-ray film cassette responsive to the full insertion of the X-ray film cassette into said light-projecting means for effecting the motorized movement of said magnet in the pivoting direction of the slide plate into the X-ray film cassette.

3. An arrangement as claimed in claim 1, comprising drive means drivable responsive to insertion of the X-ray film cassette into said light-projecting means for pivoting said magnet.

4. An arrangement as claimed in claim 1, comprising switch means responsive to the pivoting means for said magnet for initiating the light projection in the position of the magnet in which the latter maintains said window of the X-ray film cassette in an opened condition.

5. An arrangement as claimed in claim 3, said drive means having damper means associated therewith for limiting the speed of movement of said magnet.

6. An arrangement as claimed in claim 1, said resilient tongue comprising a portion of the surface of said slide plate, said resilient tongue covering the opening of the window in the closed position of the latter and extending therein, and said resilient tongue being dimensioned in conformance with the narrower dimensions of said window.

* * * * *